: 3,251,694
Patented May 17, 1966

3,251,694
PROCESS FOR PREPARING A READY-TO-EAT ALIMENTARY PASTE
Bayard S. Scotland, 264 N. Joliet St., Joliet, Ill.
No Drawing. Filed June 5, 1964, Ser. No. 373,042
5 Claims. (Cl. 99—85)

This invention relates to food products such as represented by macaroni, spaghetti, noodles, vermicelli, and the like, including the method of making the same. More particularly, the invention is concerned with food products such as macaroni, spaghetti, noodles, and vermicelli which are pre-cooked and are readily edible and digestible as is, without further processing.

Food products of the alimentary paste type are well known and have been used for hundreds of years both in Europe and in the United States. These food products are generally prepared by moistening a semolina or flour with water to form a paste. The paste is then kneaded thoroughly and forced through a die of an extruder or press to form pieces, for example, of macaroni. Thereafter the macaroni is dried in air, in large drying rooms or in ovens to a moisture content of 11 to 13%. The dried product is then cut to the necessary length, if necessary, and packaged without further treatment. To prepare the resulting dry product for consumption, it is necessary to cook it, usually by boiling in water for 7 to 15 minutes in order to tenderize it and make it palatable for human consumption. Ordinarily, a considerable amount of cooking is required to reduce the hard dried product to an edible form. In the present description the term macaroni is merely illustrative of food products of the alimentary paste type and shall be construed to include spaghetti, noodles, vermicelli, and the like.

There have been a number of processes which have been proposed for making a quick-cooking macaroni product, but none of these processes have been entirely satisfactory for various reasons. For example, it has been suggested that the macaroni be made with thinner walls so as to facilitate the cooking thereof. However, it has been found in practice that the walls of the macaroni made in this manner have a tendency to collapse when boiled in water in accordance with usual cooking methods. Moreover, when the walls collapse during cooking, the macaroni not only presents a somewhat non-appetizing mass, but prevents the cooking medium, juices, seasonings, and sauces from coming in contact with the interior walls of the macaroni. In addition, none of the proposed processes has succeeded in producing a macaroni product which is truly edible without further processing whether the products are tubular, such as macaroni, or non-tubular, such as noodles.

Accordingly, it is an object of this invention to provide a precooked alimentary paste product, such as macaroni, which requires no further processing, in order to render it edible.

It is a further object of this invention to provide an alimentary paste product which can be readily rehydrated and served in the usual manner as other food products such as macaronis of the alimentary paste type.

A further object of this invention is to provide a process of making an alimentary paste product which is not only precooked and readily edible without further cooking, but can be rehydrated and served in the usual manner as other food products of this character.

A further object of this invention is to provide a process of making a precooked alimentary paste product which can be packaged in the same manner as conventional alimentary paste products without subsequent spoilage.

These and other objects of the invention will be apparent from the description which follows.

According to the present invention, a precooked alimentary paste product, such as macaroni, which is characterized by being readily edible, is prepared in the following manner. An alimentary paste or dough is made in the conventional manner from water and semolina or wheat flour. Eggs, dried or whole, and other ingredients may be added, if desired, as is well known in the art. The paste is thereafter kneaded and then formed into the desired shape by extruding the paste through a die plate. The freshly extruded moist pieces, such as macaroni, are then placed on a gently vibrating metallic surface where the pieces are subjected to a drying and cooking process. In general, this drying and cooking is effected by radiant infrared heat such that the metallic surface is heated at a temperature from 300° to 700° F. for a period of about 3 to 9 minutes. The infrared heat source not only heats the macaroni pieces directly, but the metallic surface also, which in turn furnishes heat by conduction to the macaroni pieces. Simultaneously with the application of the radiant and conductive heat, the air above the macaroni pieces is caused to move by means of an exhaust fan whereby the air, which is moisture laden due to the foregoing radiant and conductive heat acting upon the pieces, is removed so as not to interfere with the escape of moisture from the pieces. Due to the combination of these factors, the macaroni is not only dried but cooked. The resulting product can be directly eaten in much the same manner as the well known chow-mein noodles, which, of course, are prepared in an entirely different manner. In addition, the macaroni formed by the present process completely disintegrates when chewed, and is tasty in contrast to the ordinary macaroni which merely forms a gummy unpalatable mass when chewed.

In preparing the precooked food products of the character described herein, no novelty is claimed for the making of the alimentary paste (or dough) per se which is mixed, kneaded, and formed or extruded by well known and conventional means. However, the manner in which the extruded pieces are subsequently processed to form a precooked product, which is also readily edible, is believed to be new as well as the product resulting therefrom. A more detailed description of the process whereby the extruded pieces of alimentary paste or dough are converted into a precooked and edible product follows.

As the moist extruded pieces of alimentary dough or paste leave the extruder, they are transported to an oven. The actual transporting of the pieces can be effected by several means such as by blowing them through a pipe with warm moving air or by a mechanical conveyor surrounded by warm moving air. Where a pipe is employed, there is provided at the end thereof a moving spout which deposits the pieces over the entire width of the receiving end of a metallic surface or pan. During the transfer of the pieces from the extruder to the pan, the external surface of the pieces becomes sufficiently dried so that they do not stick to the pan. The metallic surface or pan is ordinarily tilted and mounted on an agitating mechanism which causes the pieces to move along the length of the metallic surface due to a combination of simple gravity and vibration, which expedient is well known in the art. The metallic surface which is usually made of metal, such as aluminum, and a source of infrared heat mounted above the metallic surface constitutes the oven which may be open, closed, or partially open and closed. The principal source of heat for drying and cooking the extruded pieces comes from an infrared heat source, electric or gas, above the metallic surface or pan. The infrared heat source will, of course, heat the extruded pieces directly. In addition, the infrared heat source will also heat the metallic surface (or pan) which in turn will act as a secondary source of heat to dry and cook the pieces by conduction. The air between the metallic surface (or pan) and the heat source will also be heated, and this air is circulated by an exhaust fan. This circulating air will in turn remove the moisture liberated from the extruded pieces due to the combined radiant and conductive heating effects referred to above.

In general, it will be found that maintaining a temperature of 300° F. at the metallic surface on which the extruded pieces are placed for a period of about 9 minutes will produce a completely precooked edible food product. Similarly, if the heating surface is maintained at 500° F., about 6 minutes will be required to form a completely precooked and edible macaroni product. On the other hand if the temperature is maintained at 700° F., only 3 minutes will be required.

If, for example, a 700° temperature is employed, the pan is tilted at such an angle and vibrated at such a rate as to cause the macaroni pieces to pass through the entire length of the pan or oven in 3 minutes. When the completely precooked and edible pieces reach the end of the oven or pan, they can be transferred to suitable storage or conveyor means for subsequent packaging. Similarly, the tilt and vibration rate can be modified for a 5 and 7 minute cycle, respectively. Moreover, the degree to which the metallic surface or pan is tilted will determine the speed of movement of the extruded pieces through the heating zone of the oven. Thus, for a time range of 3 to 9 minutes with a temperature range of 700° to 300° F., the proposed process will be controlled by the following factors: (1) number and size of the infrared lamps (or infrared gas burners); (2) distance of lamps (or burners) above metallic surface or pan; (3) tilt of the metallic surface or pan; (4) degree of agitation of pan; (5) exhaust fan size and speed; (6) degree of oven closure; (7) the shape, size, and thickness of the extruded pieces on the metallic surface or pan.

It will be obvious to those skilled in the art from the foregoing description that numerous modifications can be made in the apparatus described above. Thus, the number and wattage of the infrared lamps (or burners) employed as a source of the infrared heat can be varied as desired. In addition, the intensity of the radiation from these lamps onto the metallic surface can be controlled by raising and lowering the lamps. As to the size and speed of the exhaust fan, it is only necessary that the heated air above the macaroni pieces be moved at such a rate so as to insure that the moisture laden air above the pieces is swept away so as not to interfere with the drying thereof.

In this connection, it has been noted that when the product of this invention has been packaged, it has an unusually long shelf life and does not become wormy in the manner that ordinary macaroni products do. This is undoubtedly due to the relatively high temperatures employed in the process whereby the macaroni is precooked and rendered edible.

Although the present process has been utilized with an oven having a capacity of 250 lbs. of dough (flour and water) per hour, it is evident that ovens consisting of tilted and vibrated metallic pans on surfaces plus a source of radiant heat could be enlarged to a capacity of 1000 lbs. and more per hour.

In addition, the present process is equally applicable to alimentary paste or dough made from water and flour derived from corn, rye, barley, potatoes oats and the like.

The following specific examples are further illustrative of my invention, and are not intended as limitations thereon.

*Example I*

About 250 lbs./hr. of semolina (14% moisture) and about 82 lbs./hr. of water were fed to a continuous macaroni press fitted with a macaroni type die and cutting knife which formed pieces of semielbow type with an outside diameter of 0.111 inch and a wall thickness of 0.0175 inch. The extruded pieces as formed were conveyed pneumatically to a metallic surface or pan of an oven where the pieces were subjected to radiant heat from an overhead infrared source which maintained the metallic surface at a temperature of 500° F. for a period of 6 minutes. Simultaneously, during this period, the air surrounding the extruded pieces was also heated by the infrared heat source and was caused to move over the extruded pieces by means of an exhaust fan positioned at the end of the oven. After 6 minutes of heating at 500° F. under the foregoing conditions, a macaroni product was formed which was quite friable and unlike ordinary types of macaroni was completely edible, having a palatable cooked macaroni flavor.

*Example II*

The procedure of Example I was repeated except that the press was fitted with a die which extruded pieces approximating in size ordinary elbow macaroni. The same type of precooked product having similar friability and flavor was formed as in Example I above.

The products made from Examples I and II above were prepared for the table according to the following recipe, along with ordinary macaroni. The recipe and the procedure for each of these three types of macaroni were as follows:

(1) Place 6 oz. of each of the above 3 macaronis into separate pans containing 1 pint of rapidly boiling water to which ½ tsp. salt has been added.

(2) Mix to moisten.

(3) Seconds later, when each of the pans of water and macaroni are boiling and foaming hard, cover and remove from heat. Let stand covered for about 3 minutes to rehydrate the macaroni.

The two products obtained from Examples I and II above which were prepared according to the invention were found to be tender when chewed and had a typical cooked macaroni flavor. On the other hand, the ordinary elbow macaroni was obviously not ready to eat since about half of the added water was still evident in the pan. The individual pieces were not fully rehydrated and were found to be tough and crunchy with a raw starch flavor.

From the foregoing, it is obvious that the macaroni product of the present invention is entirely different from ordinary macaroni. Due to the precooked nature of the product of this invention, it is possible to completely rehydrate and prepare the product for table use, such as in salads, within approximately 2 to 3 minutes whereas the conventional macaroni product now on the market requires from 7 to 15 minutes and more. It should be noted that in preparing the product of this invention for table use in accordance with the above recipe, no collapse of the macaroni walls occurs, notwithstanding that the macaroni is precooked.

The finished product of the present invention, as it comes from the oven, can be described as having a toasty flavor which is retained throughout all further cooking processes. The intensity of the toasty flavor depends on the degree of drying and cooking due to the combination of radiant, conductive and convective heat applied as described above and the duration thereof. Where the heating is kept at a minimum and yet produces a completely precooked product, the color of the product is near white and has a slight toasty flavor. On the other hand, where the heat is applied at a maximum level so as also to produce a completely precooked product, the color of the product is golden to brown and has a pronounced but pleasing toasted flavor. In either case, whether the product is near white or brown in color, it can be eaten without further processing. It is thus apparent that the macaroni product of this invention is truly a new food product and one that has heretofore been unkown to the art. The product of this invention is not only characterized by a tasty and palatable toasty flavor, but this flavor is retained through all later processing such as rehydration. Moreover, the precooked nature of the macaroni of the present invention does not prevent it from being prepared in a manner similar to other macaronis. The precooked macaroni of this invention is further characterized by having a moisture content less than 13% and usually about 1 to 6%.

It will be apparent to those skilled in the art that further changes and modifications may be made without departing from the scope and spirit of my invention. Accordingly, it is intended that all matter contained in the foregoing description shall be interpreted as illustrative and not in a limited sense.

What is claimed is:

1. A process of making a precooked, edible food product of the alimentary paste product type which is characterized by a moisture content of 1–6% and which comprises forming a mixture of semolina flour and water, mixing said flour and water to form a uniform dough, extruding said dough in pieces of a desired shape, partially drying said pieces so that the pieces do not adhere to one another, conveying said pieces through an oven, and simultaneously cooking said pieces by means of radiant and conductive heat for a period of 3 to 9 minutes through a temperature range of 700° to 300° F., respectively, while also directing a flow of heated air over said pieces, said conductive heat being conveyed to said pieces by means of a non-perforated pan element.

2. The process of claim 1 in which the temperature is maintained at about 300° F. for a period of about 9 minutes.

3. The process of claim 1 in which the temperature is maintained at about 500° F. for a period of about 6 minutes.

4. The process of claim 1 in which the temperature is maintained at about 700° F. for a period of about 3 minutes.

5. A process of making a precooked edible food product of the alimentary paste product type which comprises forming a mixture of flour and water, mixing said flour and water to form a uniform dough, extruding said dough in pieces of the desired shape, partially drying said pieces to prevent sticking thereof to one another, and conveying said pieces through means which cook said pieces by radiant and conductive heat for a period of 3 to 9 minutes through a temperature range of 700° to 300° F., respectively, while directing a flow of heated air over said pieces, said conductive heat being conveyed to said pieces by means of a non-perforated pan element.

References Cited by the Examiner

UNITED STATES PATENTS

| 1,756,992 | 5/1930 | Quiggle | 99—85 X |
| 2,552,120 | 5/1951 | Scotland | 99—85 X |
| 3,151,950 | 10/1964 | Newman et al. | 34—41 X |

FOREIGN PATENTS 871,166  6/1961  Great Britain.

OTHER REFERENCES

Food Engineering, June 1955, page 58.

A. LOUIS MONACELL, *Primary Examiner.*

RAYMOND N. JONES, *Examiner.*